UNITED STATES PATENT OFFICE.

ERWIN D. HILL, OF MARIETTA, OHIO.

INSECTICIDE FOR POULTRY, NESTS, &c.

SPECIFICATION forming part of Letters Patent No. 254,317, dated February 28, 1882.

Application filed August 25, 1881. (No specimens.)

*To all whom it may concern:*

Be it known that I, ERWIN D. HILL, a citizen of the United States, residing at Marietta, in the county of Washington and State of Ohio, have invented certain new and useful Improvements in Insecticides for Poultry, Nests, &c.; and I do hereby declare the following to be a full, clear, and exact description of the invention, such as will enable others skilled in the art to which it appertains to make and use the same.

My invention consists of a poisonous compound designed to protect hens' nests, roosts, and houses from the ravages of vermin.

The compound is composed of hydrated plaster-of-paris, corrosive sublimate, water, lard-oil, and white precipitate. This composition is intended to be placed in the nests. In the composition for the houses and roosts red precipitate is used instead of the white precipitate, and linseed-oil in place of the lard-oil. By this alternation the composition will be made to stick to the roosts and harden; also, by the use of the red precipitate a more suitable color will be imparted to the composition.

The composition is prepared in the following manner: Calcined plaster-of-paris is mixed with water and molded into any convenient form, though that of an artificial egg is preferable to any other for the purposes intended. The molded plaster-of-paris is then placed in a mixture of corrosive sublimate and water, mixed in the proportions of one ounce of sublimate to two quarts of water. The plaster-of-paris remains in this mixture a few seconds, after which it is dried and painted with a mixture of lard-oil and white precipitate, mixed in the proportions of two ounces of the precipitate to one pint of the oil. When dry the egg is ready for use as a nest-egg.

In the preparation of the mixture for the roosts and houses, in which it is preferable to use red precipitate and linseed-oil as equivalents to the white precipitate and lard-oil, the same proportions are preserved.

By the use of this poisonous composition the hens' nests and roosts will be kept entirely free from vermin, and the hens will not be so liable to disease.

The most convenient form for using the composition, when intended for nests, is that of an artificial egg; but when it is used generally as an insect-destroyer it may be ground into a powder, cut into blocks, or broken into lumps, as desired.

When the composition is prepared as above stated it is necessary that the several poisonous ingredients entering into the composition should be thoroughly mixed with the plaster-of-paris, so that when it is broken into lumps or ground into powder said ingredients shall be evenly distributed through it. The quantity of plaster-of-paris used depends wholly upon the amount of composition prepared. The corrosive sublimate, water, and white precipitate, or its equivalent, red precipitate, are mixed in the proportions of one ounce of the sublimate and two ounces of the precipitate to two quarts of water, and enough of this poisonous mixture is added to any desired quantity of plaster-of-paris to bring it to the consistency of a thick dough. The composition is then allowed to harden, when it can be broken into lumps or ground into powder, as desired.

What I claim as new is—

A poisonous compound composed of plaster-of-paris, corrosive sublimate, lard oil, and white precipitate, or the equivalents of the latter two ingredients—viz., red precipitate and linseed-oil—mixed in the manner and for the purposes set forth.

In testimony whereof I have affixed my signature in presence of two witnesses.

ERWIN D. HILL.

Witnesses:
 WM. M. NAYLOR,
 SIMON S. PORTER.